(12) United States Patent
Herthan (10) Patent No.: US 9,205,727 B2
(45) Date of Patent: Dec. 8, 2015

(54) METHOD FOR ACTUATING A CLOSURE ELEMENT ARRANGEMENT IN A MOTOR VEHICLE

(75) Inventor: Bernd Herthan, Michelau (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 75 days.

(21) Appl. No.: 14/113,750

(22) PCT Filed: Feb. 24, 2012

(86) PCT No.: PCT/EP2012/000811
§ 371 (c)(1),
(2), (4) Date: Feb. 10, 2014

(87) PCT Pub. No.: WO2012/146331
PCT Pub. Date: Nov. 1, 2012

(65) Prior Publication Data
US 2014/0195073 A1 Jul. 10, 2014

(30) Foreign Application Priority Data

Apr. 27, 2011 (DE) .......................... 10 2011 018 847

(51) Int. Cl.
*G06F 7/00* (2006.01)
*B60J 5/10* (2006.01)
(Continued)

(52) U.S. Cl.
CPC ............. *B60J 5/101* (2013.01); *B60R 25/2045* (2013.01); *B60R 25/2054* (2013.01); *E05F 15/73* (2015.01);
(Continued)

(58) Field of Classification Search
None
See application file for complete search history.

(56) References Cited

U.S. PATENT DOCUMENTS 7,710,245 B2 5/2010 Pickering
2002/0152010 A1 10/2002 Colmenarez et al.
(Continued)

FOREIGN PATENT DOCUMENTS

DE 102007023140 10/2008
DE 102009019673 11/2010
(Continued)

OTHER PUBLICATIONS

International Search Report, International Application No. PCT/EP2012/000811, corresponding to the U.S. Appl. No. 14/113,750, mailed Jul. 5, 2012, 4 pages.
(Continued)

*Primary Examiner* — Adam Alharbi
(74) *Attorney, Agent, or Firm* — Pauly, Devries Smith & Deffner, LLC (57) ABSTRACT

The invention relates to a method for actuating a closure element arrangement in a motor vehicle, wherein the closure element arrangement has a closure element, a drive arrangement associated with the closure element, a control arrangement and a sensor arrangement having at least one sensor element that is particularly in the form of a proximity sensor, wherein operator control event monitoring involves the control arrangement being used to monitor sensor events in the sensor measured values from the sensor arrangement for whether a predetermined operator control event is occurring, and the result of the operator control event monitoring is taken as a basis for actuating the drive arrangement. It is proposed that the operator control event monitoring is based on at least one operator control event model stored in the control arrangement and that the operator control event model is produced and/or parameterized during use compliant with normal operation.

18 Claims, 3 Drawing Sheets

(51) Int. Cl.
   *B60R 25/20* (2013.01)
   *E05F 15/73* (2015.01)
(52) U.S. Cl.
   CPC ...... *E05Y 2400/852* (2013.01); *E05Y 2400/858* (2013.01); *E05Y 2800/40* (2013.01); *E05Y 2900/546* (2013.01)

(56) References Cited

U.S. PATENT DOCUMENTS

2005/0258934 A1* 11/2005 Buck et al. .................. 340/5.23
2009/0306848 A1* 12/2009 Kohsaka et al. ............... 701/33
2011/0276234 A1* 11/2011 Van Gastel .................... 701/49

FOREIGN PATENT DOCUMENTS

DE      102009040395      4/2011
EP      1970265           9/2008

OTHER PUBLICATIONS

"German Search Report," for DE Application No. 102011018847.9, mailed Jan. 26, 2012 (7 pages).

"International Search Report and Written Opinion," for PCT/EP2012/000811, mailed Jul. 5, 2012 (7 pages).

* cited by examiner

METHOD FOR ACTUATING A CLOSURE ELEMENT ARRANGEMENT IN A MOTOR VEHICLE

CROSS-REFERENCE TO RELATED APPLICATIONS

This application is a national stage application under 35 U.S.C. 317 of Inter-national Patent Application Serial No. PCT/EP 2012/00811, entitled "Verfahren zur Ansteuerung einer Verschlusselementanordnung eines Kraftfahrzeugs" filed Feb. 24, 2012, which claims priority from German Patent Application No. DE 10 2011 018 847.9, filed Apr. 27, 2011, the disclosures of which are hereby incorporated by reference herein in their entirety.

FIELD OF THE INVENTION

The invention relates to a method for actuating a closure element arrangement in a motor vehicle and to a closure element arrangement in a motor vehicle.

BACKGROUND

Motor vehicles today are increasingly equipped with closure elements that can be operated by a motor. By way of example, such closure elements may be doors, particularly sliding doors, hatches, particularly tailgates, trunk lids, hoods, cargo space floors or the like in a motor vehicle. In this respect, the term "closure element" has a broad meaning in the present case.

An added-convenience function that is becoming increasingly important today is the automatic operation of the motor-driven tailgate of a motor vehicle. In the case of the known added-convenience function (DE 20 2005 020 140 U1) on which the invention is based, provision is made for an operator control event from the operator, in this case a foot movement by the operator, to prompt the motor-driven opening of the tailgate. For this purpose, a drive arrangement associated with the tailgate, a control arrangement and a sensor arrangement are provided. The control arrangement monitors the sensor events that occur in the sensor measured values on the sensor arrangement for whether the above operator control event is occurring. Depending on the result of this operator control event monitoring, the drive arrangement is actuated accordingly.

The above known method for sensing an operator control event by sensor allows particularly convenient motor-driven operation of the tailgate of a motor vehicle. The reliability of the operation is governed by the design of the control arrangement and of the sensor arrangement. Difficulties can arise particularly when different operators of the motor vehicle implement the foot movement in question in a totally different manner, particularly on account of different anatomical circumstances. This can result in an operator movement not being recognized as an operator control event even though the operator has executed this movement in a subjectively correct manner.

The invention is based on the problem of embodying and developing the known method such that a high level of reliability is ensured for the operation even when there are multiple potential operators.

SUMMARY

A substantial aspect is the fundamental consideration that some of the operator control event monitoring can be altered during use compliant with normal operation. In the present case, "use compliant with normal operation" means the state of use in which the motor vehicle is available to the user for normal operation. Setup or installation work by the manufacturer in the course of production of the motor vehicle before it is delivered is not attributable to use compliant with normal operation and comes before use compliant with normal operation. The flexibility thus obtained for the operator control event monitoring allows the operator control event monitoring to be adapted to suit the respective operator who is active for the operation of the motor vehicle.

Specifically, it is proposed that the operator control event monitoring is based on at least one operator control event model stored in the control arrangement and that the operator control event model is produced and/or parameterized during use compliant with normal operation.

It is thus fundamentally possible for operator control events to be taught from scratch. On the other hand, however, it is also conceivable for predefined operator control events to be parameterized for the movement processes of the respective operator during use compliant with normal operation.

The operator control event model is a data model that is directed to the sensor measured values from the sensor arrangement and that contains a set of the variables that are characteristic of the respective operator control event. Alternatively, the operator control event model can comprise entire profiles for the sensor measured values from the sensor arrangement. Other variants for the design of the operator control event model are conceivable.

Of particular importance to the solution according to the proposal is the fact that the operator control event model can be produced or parameterized during use compliant with normal operation. This makes particularly the ongoing customization of the respective operator control event model possible during ongoing operation.

Some embodiments relate to the use of the motor vehicle by at least two potential operators as required. Optimum user friendliness is obtained in an embodiment, on the basis of which each potential operator has an associated operator control event model. This ensures that an operator control event is always safety recognized when there are multiple potential operators, even if the potential operators have totally different movement behaviors.

In the case of some embodiments, the operator control event model is produced or modified by virtue of the control arrangement being put into a learning mode. This is a variant in which the operator retains full control over a change to the operator control event model, which is considered to be an advantage, depending on the operator.

The situation is different in the case of some embodiments. In this case, the control arrangement uses different strategies to itself recognize that the operator control event model needs to be produced or parameterized. These automatic functions are not noticeable to the operator and result in a quite particularly high level of operator control convenience.

The solution according to the proposal has proved particularly successful when the operator control event is a foot movement by the operator. In this case, experience has shown that the movement processes of different operators have quite pronounced differences.

On the basis of a further teaching according an embodiment, which can likewise be attributed separate importance, a closure element arrangement that operates on the basis of the method according to the proposal. Reference can be made to all statements that are suitable for describing the closure element arrangement as such.

In an embodiment, the invention provides a method for actuating a closure element arrangement in a motor vehicle, wherein the closure element arrangement has a closure element, a drive arrangement associated with the closure element, a control arrangement and a sensor arrangement having at least one sensor element, wherein operator control event monitoring involves the control arrangement being used to monitor sensor events in the sensor measured values from the sensor arrangement for whether a predetermined operator control event is occurring, and the result of the operator control event monitoring is taken as a basis for actuating the drive arrangement, wherein the operator control event monitoring is based on at least one operator control event model stored in the control arrangement and in that the operator control event model is produced and/or parameterized during use compliant with normal operation.

In an embodiment, at least two potential operators of the motor vehicle are envisaged and in that the control arrangement ascertains which of the potential operators is active for the operation of the motor vehicle.

In an embodiment, at least two potential operators of the motor vehicle each have an individual associated radio key and in that the control arrangement ascertains from the presence and/or the operation of the radio key which of the potential operators is active for the operation of the motor vehicle.

In an embodiment, at least two operator control event models are stored in the control arrangement that are associated with different operators and in that the operator control event monitoring is based on the operator control event model of the respective operator who is active for the operation of the motor vehicle.

In an embodiment, the control arrangement can be put into a learning mode in which the operator performs an operator control event, and in that the control arrangement is used to produce or parameterize and subsequently store an operator control event model from the resulting sensor measured values.

In an embodiment, the learning mode is performed on an operator-specific basis such that the operator control event model is stored for a particular operator.

In an embodiment, if a sensor event has been recognized as an operator control event in the course of the operator control event monitoring, the control arrangement is used to ascertain the operator who is active for the operation of the motor vehicle and the operator control event model on which the operator control event is based is associated with the operator who is active for the operation of the motor vehicle.

In an embodiment, if a sensor event has not been recognized as an operator control event in the course of the operator control event monitoring and subsequently, actuation of the drive arrangement has been initiated manually, the control arrangement is used to produce or parameterize an operator control event model from the sensor event such that the sensor event is recognized as an operator control event during further operation.

In an embodiment, the operator control event is defined as a predetermined operator movement that is sensed over the time profile of the sensor measured values.

In an embodiment, at least one operator control event is defined as a foot movement by the operator.

In an embodiment, at least one operator control event is defined as a back and forth movement of the foot of the operator.

In an embodiment, the operator control event model contains a series of features that are associated with the profile of the sensor measured values from at least one sensor element that is typical of the operator control event and that, in the course of the operator control event monitoring, are first of all extracted from the sensor measured values and then classified in the manner of pattern recognition.

In an embodiment, the closure element arrangement has a closure element, a drive arrangement associated with the closure element, a control arrangement and a sensor arrangement having at least one sensor element, wherein operator control event monitoring involves the control arrangement monitoring sensor events in the sensor measured values from the sensor arrangement for whether a predetermined operator control event is occurring, and the result of the operator control event monitoring is taken as a basis for actuating the drive arrangement, such as for the purpose of carrying out a method as described herein, wherein the operator control event monitoring is based on at least one operator control event model stored in the control arrangement nd in that the operator control event model can be produced and/or parameterized during use compliant with normal operation.

In an embodiment, the at least one sensor element comprises a proximity sensor.

In an embodiment, the particular operator comprises the operator who is active for the operation of the motor vehicle.

In an embodiment, the actuation of the drive arrangement occurs within a predetermined period.

In an embodiment, the actuation of the drive arrangement has been initiated manually using a radio.

In an embodiment, the operator control event model is associated with an operator.

In an embodiment, the operator control event model is associated with the operator who is active for the operation of the motor vehicle.

In an embodiment, the sensor arrangement has at least two sensor elements that are in the form of proximity sensors that are arranged in or on a rear trim portion.

In an embodiment, the rear trim portion comprises the rear bumper of a motor vehicle.

In an embodiment, the at least two sensor elements extend over a substantial portion of the width of the motor vehicle.

In an embodiment, during the operator control event both sensor elements produce a pulse-like time profile for the sensor measured values sensor pulse.

In an embodiment, the features are defined as a width and/or as a height and/or as an edge gradient and/or as a curvature of portions of the sensor pulses and/or as a time offset between two sensor pulses from a sensor element.

In an embodiment, the at least one sensor element comprises a proximity sensor.

BRIEF DESCRIPTION OF THE FIGURES

The invention is explained in more detail below with reference to a drawing that merely shows an exemplary embodiment. In the drawing.

DETAILED DESCRIPTION

Figure 1:
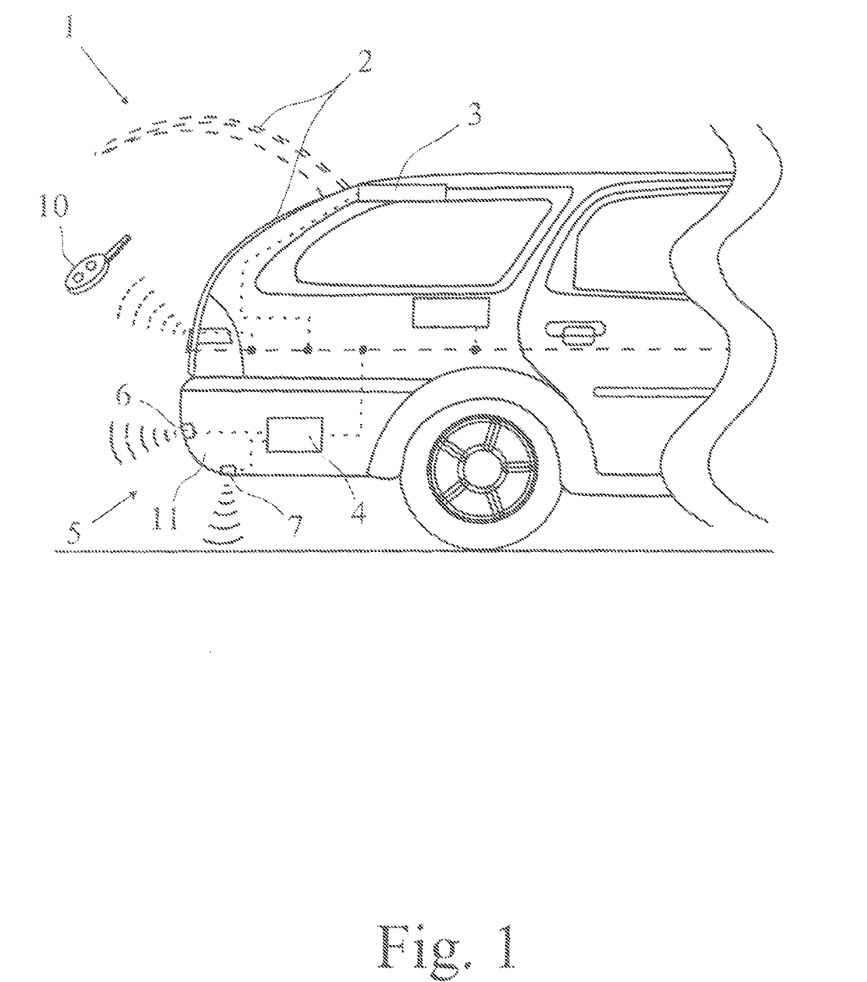
FIG. 1 shows the rear of a motor vehicle with a closure element arrangement according to the proposal for carrying out the method according to the proposal.

The method according to the proposal is explained below with reference to a closure element arrangement 1 in a motor vehicle, which closure element arrangement has a closure element 2 in the form of a tailgate.

The embodiment of the closure element 2 as a tailgate on a motor vehicle is possible in the present case. However, for the broad understanding of the term "closure element", reference can be made to the introductory part of the description. In this respect, all statements pertaining to a tailgate 2 apply accordingly to all other types of closure elements.

The tailgate 2 has an associated drive arrangement 3 that can be used to prompt motor-driven adjustment of the tailgate 2 between the closed position, shown in a solid line in FIG. 1, and the open position, shown in a dashed line in FIG. 1.

In addition, a control arrangement 4 is provided that is used, inter alia, for actuating the drive arrangement 3. A sensor arrangement 5 having at least one sensor element 6, 7, which is particularly in the form of a proximity sensor, communicates with the control arrangement 4. The sensor arrangement 5, which is yet to be explained, is designed such that it can be used to sense operator movements by sensor.

In the case of the exemplary embodiment shown, the control arrangement 4 has a central hardware structure. Alternatively, it is conceivable for the control arrangement 4 to have a local hardware structure. In this case, some of the control hardware can be accommodated in the sensor arrangement 5. This means that the sensor arrangement 5 has its own intelligence that can be used for signal preprocessing, for example.

In this case, particular operator movements are defined as operator control events that are each intended to initiate a particular reaction in the control arrangement 4. The operator control event can be a foot movement by the operator, as will be explained.

In order to be able to react to the occurrence of operator control events as addressed above, operator control event monitoring is envisaged, which is performed by the control arrangement 4. The operator control event monitoring involves the control arrangement 4 being used to monitor the sensor events occurring in the sensor measured values 8, 9 from the sensor arrangement 5 for whether or not a predetermined operator control event is occurring. The sensor events may be any discrepancies in the sensor measured values 8, 9 from the idle sensor measured values. The idle sensor measured values 8, 9 are present when there is no external influencing of the sensor arrangement 5 by an operator or the like.

Depending on the result of the operator control event monitoring, the drive arrangement 3 is actuated appropriately, for example the tailgate 2 is opened by motor.

Figure 2:
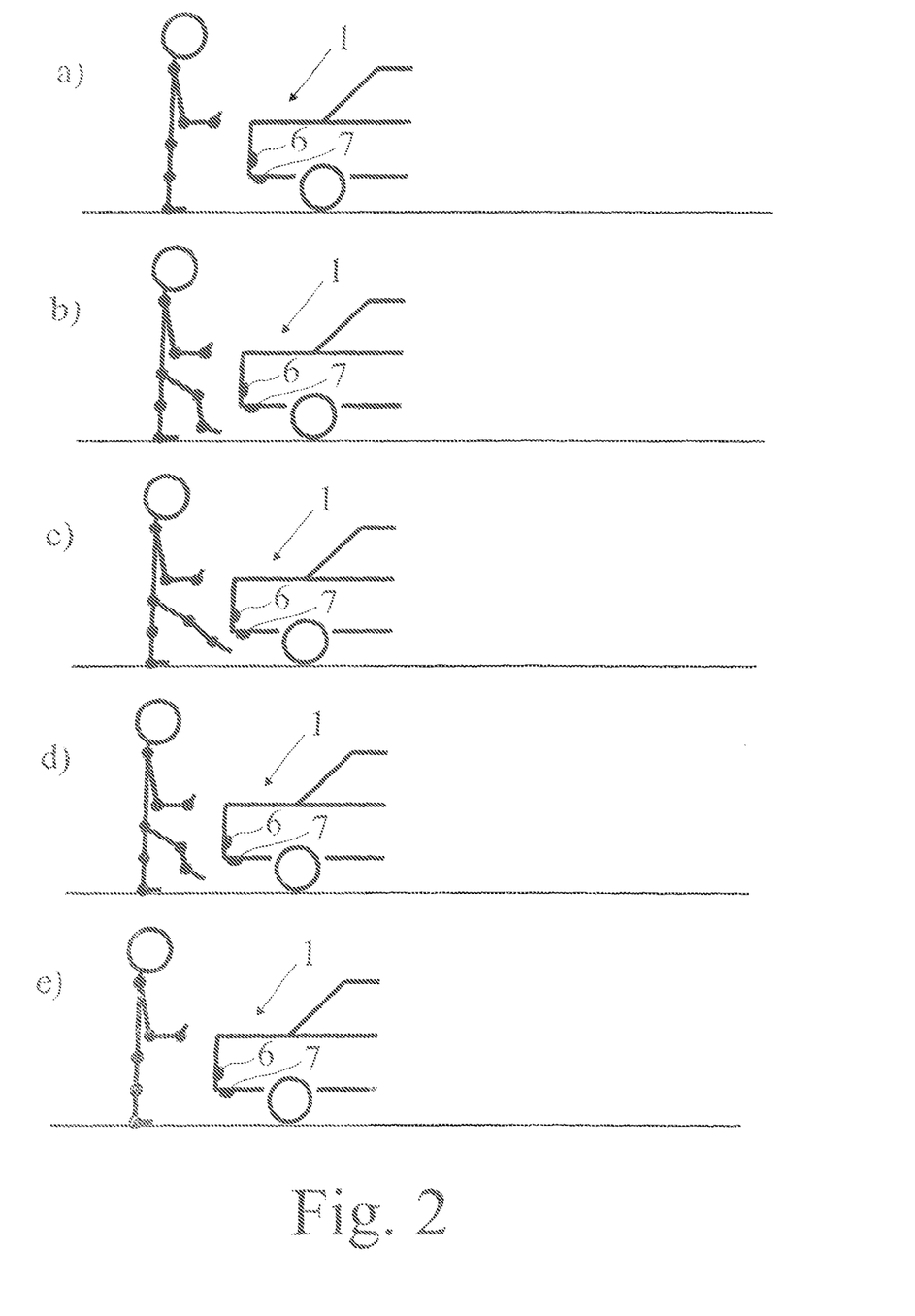
FIG. 2 shows a sequence for an operator control event according to the proposal, which operator control event is intended to be sensed, in the five stages a) to e)
Figure 3:
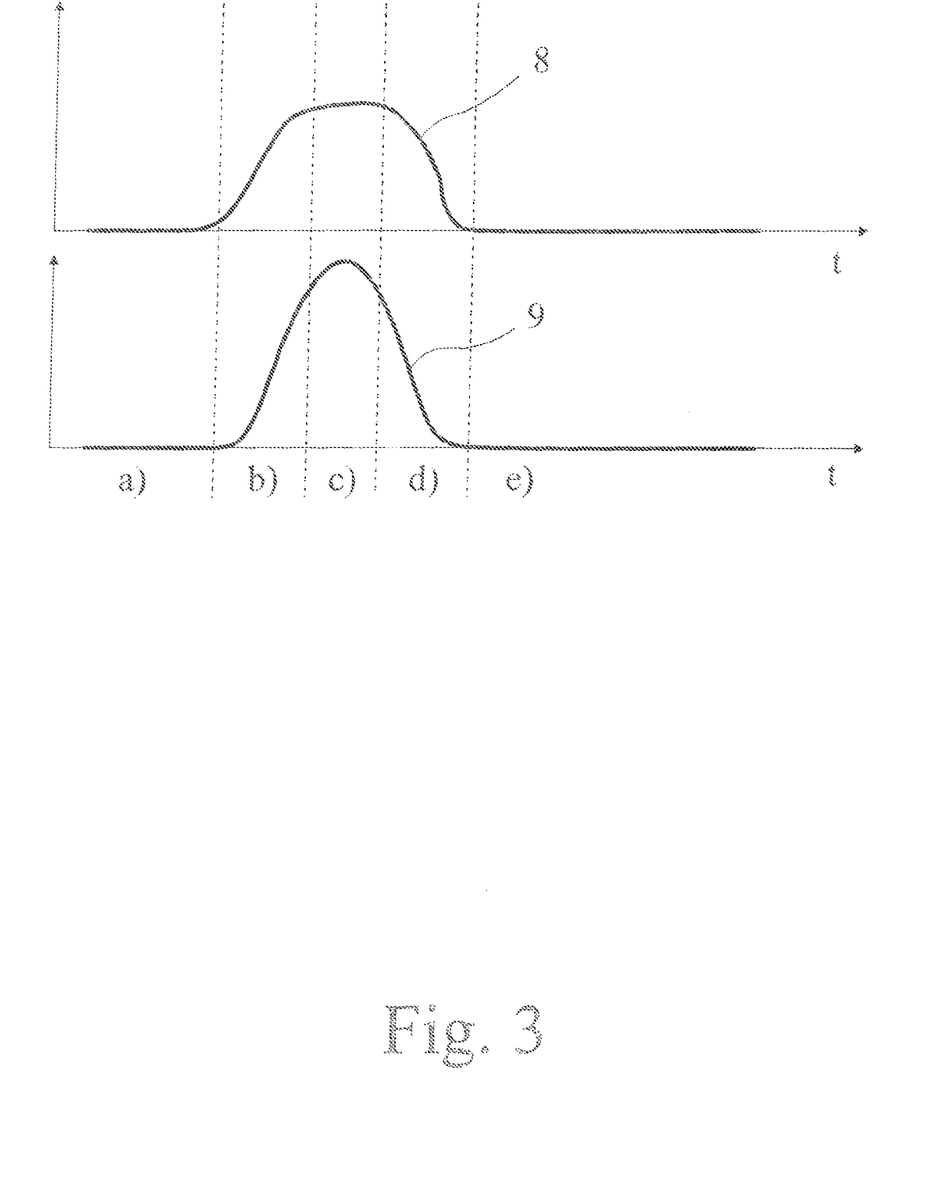
FIG. 3 shows two exemplary signal profiles for two sensor elements in the closure element arrangement shown in FIG. 1 during an operator control event as shown in FIG. 2.

Depictions a) to e) in FIG. 2 show the stages in the sequence of an operator control event that comprises back and forth movement of the foot of the operator. FIG. 3 shows the resulting sensor events in the sensor measured values 8, 9 from the two sensor elements 6, 7, the stages a) to e) that are shown in FIG. 2 being marked accordingly in the time domain in the illustration. This will be explained in detail further below A substantial aspect is now that the operator control event monitoring is based on an operator control event model stored in the control arrangement 4. The operator control event model may be an arbitrary set of variables that is suitable for characterizing the profile of the sensor measured values 8, 9 that accompanies an operator control event, as a result of which the occurrence of an operator control event can be recognized in the control arrangement 4 by means of an appropriate algorithm.

According to the proposal, the above operator control event model can be produced and/or parameterized during use compliant with normal operation. While the inclusion of the profile of sensor measured values 8, 9 is usually in the foreground when the operator control event model is produced, the parameterization of an operator control event model generally involves the reservation of stipulated model variables.

The operator control event model can be produced or parameterized as part of a learning process that is yet to be explained, for example. Alternatively, it is conceivable for this to take place automatically, as will likewise be explained.

Advantageously, at least two potential operators are envisaged for use of the motor vehicle in compliance with normal operation, wherein the control arrangement 4 always ascertains which of the potential operators is active for the operation of the motor vehicle. Various criteria can be used for ascertaining the active operator. By way of example, that operator who initiated any function of the motor vehicle as the last operator while the radio key 10 of this operator was in direct proximity to the motor vehicle can be deemed active. This can be the operator who last locked the motor vehicle closing system or the like.

A radio key 10 as above is thus used to identify the operator. In this case, at least two potential operators of the motor vehicle therefore each have an individual associated radio key 10, with the control arrangement 4 ascertaining from the presence and/or the operation of the radio key 10, as explained above, which of the potential operators is currently active for the operation of the motor vehicle.

Since it is possible for the at least one operator control event model to be produced and/or parameterized during use compliant with normal operation, it is a simple matter to implement at least two operator control event models being stored in the control arrangement 4 that are associated with different operators. A substantial aspect in this case is the fact that the operator control event monitoring is always based precisely on the operator control event model of the respective active operator. For different operators, it is therefore possible to check correspondingly different movement processes as part of the operator control event monitoring.

In an embodiment, the control arrangement 4 can be put into a learning mode in which an operator control event model is produced or parameterized. Within the learning mode, the operator can perform an operator control event, with the control arrangement 4 being used to produce or parameterize the operator control event model and subsequently file it, that is to say store it, from the resulting sensor measured values 8, 9.

In the case of the production of the operator control event model, it is possible to stipulate arbitrary operator-defined operator control events, provided that the associated operator movements can be sensed by means of the sensor arrangement 5. By way of example, not only foot movements but also other gestures, such as "swipe movement" or "sweep movement" or the like, can be taught as operator control events.

In an embodiment, the learning mode is performed on an operator-specific basis, specifically such that the operator control event model is stored for a particular operator, particularly for the operator who is active during the learning.

The learning mode can be set in various ways. By way of example, the learning mode can be set when a lock key on the radio key is operated repeatedly or for a relatively long time after a pre-determined operator action, for example switching on the ignition or unlocking, has been initiated.

A further embodiment relates to the case in which a sensor event has been recognized as an operator control event in the course of the operator control event monitoring. In the case of this embodiment, the control arrangement 4 is then used to ascertain the active operator, with finally the operator control event model on which the operator control event is based being associated with the respective active operator.

In an embodiment, provision may be made here for the operator control event monitoring always to involve all the operator control event models stored in the control arrangement 4 being used. If one of the operator control event models then results in an operator control event being recognized, this operator control event model can be associated with the respective active operator.

An interesting aspect of the latter variant is the fact that the association of the operator control event model with the respective active operator takes place automatically without the operator having to notice this. Such self-optimization of the control arrangement 4 results in a quite particularly high level of operator control convenience.

Another self-optimization is proposed for the case in which a sensor event has not been recognized as an operator control event in the course of the operator control event monitoring, wherein subsequently, particularly within a predetermined period, actuation of the drive arrangement 3 has been initiated manually, in this case using the radio key 10.

The above circumstance usually permits the conclusion that an operator has unsuccessfully attempted to initiate a function of the closure element arrangement 1, particularly the opening of the tailgate 2, by means of an operator control event, in this case by means of a foot movement, and that the operator has followed this unsuccessful attempt by instead initiating the function of the closure element arrangement 1, in this case the actuation of the drive arrangement 3, manually, particularly using the radio key 10. In such a case, provision can be made for the control arrangement 4 to produce or parameterize an operator control event model from the respective sensor event (that has initially not been recognized as an operator control event, of course), specifically such that this sensor event is recognized as an operator control event after all during further operation. In this case, provision is made here for the operator control event model produced or parameterized in this manner to be associated with an operator, here the active operator. This ensures that the operator control event performed most recently by the operator results in initiation of the desired function in future, even if this had failed during the last attempt.

A further variant of self-optimization involves the control arrangement 4 optimizing the respective operator control event model for virtually any recognition of an operator control event. For this purpose, provision is made for the control arrangement 4 to be used to ascertain and possibly store an interval value for the interval between the sensor event on which the recognition is based and the respective operator control event model whenever an operator control event has been recognized The interval value indicates the extent to which the sensor event on which the recognition is based corresponds to the criteria for recognizing an operator control event that are stipulated in the operator control event model.

On the basis of the interval value, the operator control event model is modified such that a statistical interval value, in this case the average interval value, is reduced over a number of the last operator control event recognitions. This means that an operator control event that is always recognized only just as an operator control event by a particular operator on the basis of the relevant operator control event model results in modification of the operator control event model. In this case, the modification is made such that the interval value sets itself to a reduced, in particular minimum, value, as a result of which the certainty for the operation is increased overall.

As already addressed above, the operator control event to be recognized is a predetermined operator movement that is sensed over the time profile of the sensor measured values 8, 9.

As addressed above, the operator control event to be sensed can be a foot movement by the operator, wherein the sensor arrangement 5 has at least two, in this case precisely two, sensor elements 6, 7 that are in the form of proximity sensors and that, as FIG. 1 shows, are arranged in or on a rear trim portion 11, in this case the rear bumper 11, of the motor vehicle. In this case, the two sensor elements 6, 7 can be capacitive proximity sensors having electrodes that each extend over a substantial portion of the width of the motor vehicle. This ensures that it is possible to sense the operator control event as appropriate over the substantial portion of the width of the motor vehicle.

The sensor arrangement 5 may be arranged at arbitrary locations in the motor vehicle. By way of example, it is conceivable for the sensor arrangement 5 to be arranged in the lateral region of the motor vehicle, particularly on a fender, a side door or the like.

The illustration shown in FIG. 1 reveals that the schematically shown sensing range of the upper sensor element 6 at any rate also points to the rear and the sensing range of the lower sensor element 7 at any rate also points downward. This sensor arrangement 5 accordingly results in the sensor measured values 8, 9 shown in FIG. 3.

As explained above, the predetermined operator control event can turn out to be quite different depending on the operator, as a result of which, according to the proposal, operator-specific operator control event models are used for the operator control event monitoring. In this case, here, the operator control event monitoring involves the use of fundamentally known methods of pattern recognition.

As a basis for the pattern recognition, the behavior of the sensor measured values 8, 9 from at least one sensor element 6, 7 that is characteristic of the operator control event to be sensed has a series of characteristic features associated with it that are part of the operator control event model and the occurrence of which is monitored in the course of the operator control event monitoring. The pattern recognition involves these features first of all being extracted from the sensor measured values 8, 9 and then classified.

This corresponds to the fundamental idea of pattern recognition. This involves any previously filtered measured values first of all being subjected to feature extraction. The features to be extracted need to be selected such that they are "segregation-effective". This means that the features need to be suitable for distinguishing the "with operator control event" state from the "without operator control event" state (Christopher M. Bishop, "Pattern Recognition and Machine Learning", Springer, Berlin, 2006, ISBN 0-387-31073-8).

Following the feature reduction, classification is performed in which the formation of the extracted features is associated with particular classes of patterns to be sensed.

In the case of the back and forth movement of the foot of the operator that is shown in FIG. 3, pulse-like sensor events are produced in the sensor measured values 8, 9, which are subsequently called "sensor pulses". The width, the height, the edge gradient, the curvature of portions of the sensor pulses, the time offset between two sensor pulses from a sensor element 6, 7 or the like can be defined as features to be extracted. The classification then involves these features being checked for limit values or limit ranges.

Further conceivable features in this case are the time offset between the sensor pulses from two sensor elements 6, 7 or a predetermined correlation, particularly the cross-correlation between the sensor measured values 8, 9 from two sensor elements 6, 7. These features can also be classified using limit values and limit ranges such that it is possible to infer the occurrence or non-occurrence of an operator control event together with the aforementioned features where applicable.

A substantial aspect of the above pattern recognition is the fact that the series of features on which the pattern recognition is based is associated with the operator control event model. The production or parameterization of the operator control event model involves the stipulation of these very features. The pattern recognition then progresses in a manner that is known per se.

For all of the exemplary embodiments explained above, it may once again be pointed out that the control arrangement 4 may be arranged locally in terms of hardware. By way of example, this can result in at least some of the operator control event model being stored in the sensor arrangement 5 and/or in some of the operator control event monitoring being performed in the sensor arrangement 5.

According to a further teaching, which is likewise attributed separate importance, the closure element arrangement 1 with closure element 2, drive arrangement 3, control arrangement 4 and sensor arrangement 5 is claimed as such. Reference may be made to all embodiments that are suitable for describing the closure element arrangement 1.

It has already been pointed out that both teachings according to the proposal can be applied to all types of closure elements 2. Besides the application to a tailgate 2 that has been illustrated, use on a sliding door may be singled out as quite particularly advantageous. Since sliding doors regularly sweep over just a small range of movement, the automatic functions according to the proposal that are described above can be implemented without significant risk of collision. Against this background, the application of the teachings according to the proposal to sliding doors can be include in an embodiment.

The invention claimed is:

1. A method for actuating a closure element arrangement in a motor vehicle,
   wherein the closure element arrangement has a closure element, a drive arrangement associated with the closure element, a control arrangement, and a sensor arrangement having at least one sensor element, and
   wherein the method comprises monitoring operator control events, the monitoring comprising the control arrangement being used to monitor sensor events in the sensor measured values from the sensor arrangement for whether a predetermined operator control event is occurring, and the result of the operator control event monitoring is taken as a basis for actuating the drive arrangement,
   wherein the operator control event monitoring is based on at least one operator control event model stored in the control arrangement and wherein the operator control event model is produced and/or parameterized during use compliant with normal operation,
   wherein at least two operator control event models are stored in the control arrangement that are associated with different operators, wherein the operator control event monitoring is based on the operator control event model of the respective operator who is active for the operation of the motor vehicle, and
   wherein the operator control event is defined as a predetermined operator movement that is sensed over the time profile of the sensor measured values, wherein the operator control event models are each directed to the sensor measured values from the sensor arrangement and wherein the operator control event models contain a set of the variables that are characteristic of the respective operator control event.

2. The method as claimed in claim 1, wherein at least two potential operators of the motor vehicle are envisaged and in that the control arrangement ascertains which of the potential operators is active for the operation of the motor vehicle.

3. The method as claimed in claim 1, wherein at least two potential operators of the motor vehicle each have an individual associated radio key and in that the control arrangement ascertains from the presence and/or the operation of the radio key which of the potential operators is active for the operation of the motor vehicle.

4. The method as claimed in claim 1, wherein the control arrangement can be put into a learning mode in which the operator performs an operator control event, and in that the control arrangement is used to produce or parameterize and subsequently store an operator control event model from the resulting sensor measured values.

5. The method as claimed in claim 4 wherein the learning mode is performed on an operator-specific basis such that the operator control event model is stored for a particular operator.

6. The method as claimed in claim 5, wherein the particular operator comprises the operator who is active for the operation of the motor vehicle.

7. The method as claimed in claim 1, wherein if a sensor event has been recognized as an operator control event in the course of the operator control event monitoring, the control arrangement is used to ascertain the operator who is active for the operation of the motor vehicle and the operator control event model on which the operator control event is based is associated with the operator who is active for the operation of the motor vehicle.

8. The method as claimed in claim 1, wherein if a sensor event has not been recognized as an operator control event in the course of the operator control event monitoring and subsequently, actuation of the drive arrangement has been initiated manually, the control arrangement is used to produce or parameterize an operator control event model from the sensor event such that the sensor event is recognized as an operator control event during further operation.

9. The method as claimed in claim 8, wherein the actuation of the drive arrangement occurs within a predetermined period.

10. The method as claimed in claim 8, wherein the actuation of the drive arrangement has been initiated manually using a radio key.

11. The method as claimed in claim 1, wherein at least one operator control event is defined as a foot movement by the operator.

12. The method as claimed in claim 11, wherein the sensor arrangement has at least two sensor elements that are in the form of proximity sensors that are arranged in or on a rear trim portion.

13. The method as claimed in claim 12, wherein at least one operator control event is defined as a back and forth movement of the foot of the operator.

14. The method as claimed in claim 12, wherein the rear trim portion comprises the rear bumper of a motor vehicle.

15. The method as claimed in claim 13, wherein during the operator control event both sensor elements produce a sensor pulse comprising a pulse-like time profile for the sensor measured values.

16. The method as claimed in claim 1, wherein the operator control event model contains a series of features that are associated with the profile of the sensor measured values from at least one sensor element that is typical of the operator control event and that, in the course of the operator control event monitoring, are first of all extracted from the sensor measured values and then classified in the manner of pattern recognition.

17. The method as claimed in claim 16, wherein the features are defined as at least one of a width, a height, an edge gradient, a curvature of portions of the sensor pulses, and a time offset between two sensor pulses from a sensor element.

18. A closure element arrangement in a motor vehicle, wherein the closure element arrangement has
   a closure element,
   a drive arrangement associated with the closure element,
   a control arrangement, and
   a sensor arrangement having at least one sensor element,
   wherein operator control event monitoring involves the control arrangement monitoring sensor events in the sensor measured values from the sensor arrangement for whether a predetermined operator control event is occurring, and the result of the operator control event monitoring is taken as a basis for actuating the drive arrangement,
   wherein the operator control event monitoring is based on at least one operator control event model stored in the control arrangement and in that the operator control event model can be produced and/or parameterized during use compliant with normal operation,
   wherein at least two operator control event models are stored in the control arrangement that are associated with different operators, wherein the operator control event monitoring is based on the operator control event model of the respective operator who is active for the operation of the motor vehicle,
   wherein the operator control event is defined as a predetermined operator movement that is sensed over the time profile of the sensor measured values, wherein the operator control event models are each directed to the sensor measured values from the sensor arrangement and wherein the operator control event models contain a set of the variables that are characteristic of the respective operator control event.

* * * * *